Feb. 6, 1968 B. M. JOHNSTON 3,367,077
ENCLOSURE STRUCTURE FOR BUILDINGS
Filed Feb. 15, 1966 3 Sheets-Sheet 1

INVENTOR
BOBBY M. JOHNSTON

BY Baldwin & Wight
ATTORNEYS.

INVENTOR
BOBBY M. JOHNSTON

BY Baldwin & Wight
ATTORNEYS.

United States Patent Office 3,367,077
Patented Feb. 6, 1968

3,367,077
ENCLOSURE STRUCTURE FOR BUILDINGS
Bobby M. Johnston, Dallas, Tex., assignor to Aluminum Fronts, Inc., Terrell, Tex., a corporation of Texas
Filed Feb. 15, 1966, Ser. No. 527,425
12 Claims. (Cl. 52—464)

ABSTRACT OF THE DISCLOSURE

An enclosing structure in a building includes inner and outer supporting elements between which panels, e.g. glass, are mounted by resilient heat insulating sealing means. The inner and outer elements are clamped toward one another to apply pressure to the sealing means by bolt and nut clamping pressure applying means of high heat conductivity, the bolt being connected to one of the elements and the nut applying clamping pressure to the other of the elements through a heat insulating means interposed between the nut and the other of the elements. Tightening of the nut exerts clamping pressure through the heat insulating means. One of the said elements is free from contact with the other of the elements and is free from contact with the bolt and nut means. The heat insulating means limits the relative toward-one-another movement of the two elements and so controls the pressure exerted on the sealing means and panel means.

---

This invention relates to enclosure structures for buildings, and more particularly to inclosure structures of the kind in which structural elements of relatively high heat conductivity are disposed both inside and outside a structural unit or assembly, such as a wall, and serve to support panel-like elements, e.g. glass panels.

So-called "curtain walls" are representative of constructions in which the invention may be embodied to advantage. One of the difficulties of many previously known curtain wall structures has been due to the transference of heat between metallic members arranged in couples, one element outside the structure and the other inside, the heat transference taking place through screws, bolts or other clamping means which draw the inside and outside elements of a couple together to clamp the glass or other panels in place. Various proposals for ameliorating this and other difficulties have been made prior to the present invention.

An object of the present invention is to eliminate such difficulties by providing an enclosure structure, e.g. a wall, for buildings of the kind including inner and outer framework components of relatively high heat conductivity, panel means or components mounted by the inner and outer components, and means for drawing the inner and outer components toward one another for clamping and supporting the panel means, in combination with an improved arrangement of heat insulating means which cooperate with the aforesaid components for thermally isolating the inner and outer components from one another.

A further object of the invention is to provide an enclosure structure as set forth above, further characterized in that pressure applied to sealing gaskets or the like interposed and clamped between the panel components and the inner and outer framework components is controlled through resistance to clamping offered by the heat insulating means, the advantage of thermal isolation of the inner and outer framework components and the advantage of controlled application of pressure to the sealing gaskets and the panel components being both obtained in the same structure.

Other objects of the invention will become apparent from a reading of the following description, the appended claims, and the accompanying drawings, in which:

Figure 1:
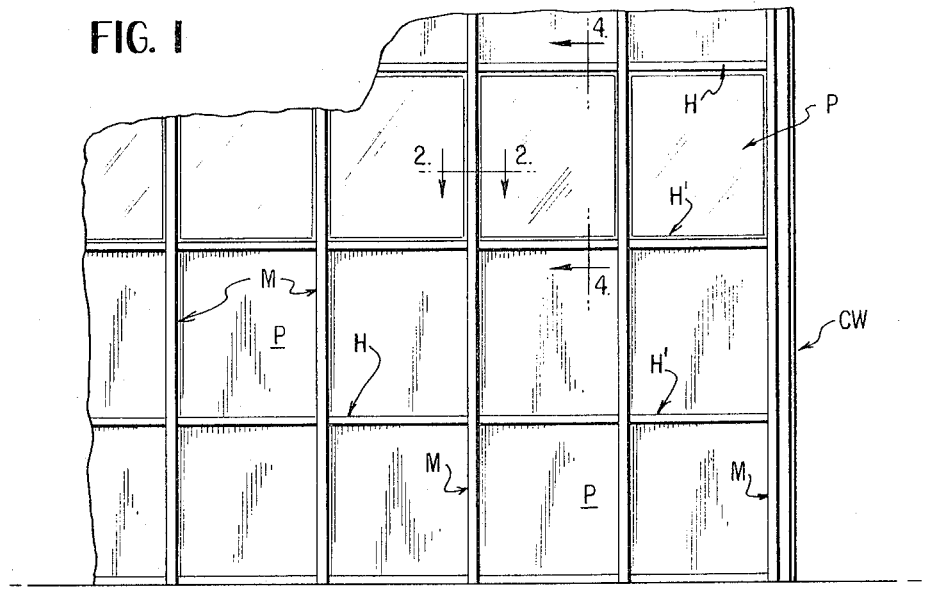
FIGURE 1 is a schematic fragmentary elevational view of a building curtain wall of one kind in which constructions embodying the invention are incorporated.
Figure 1:
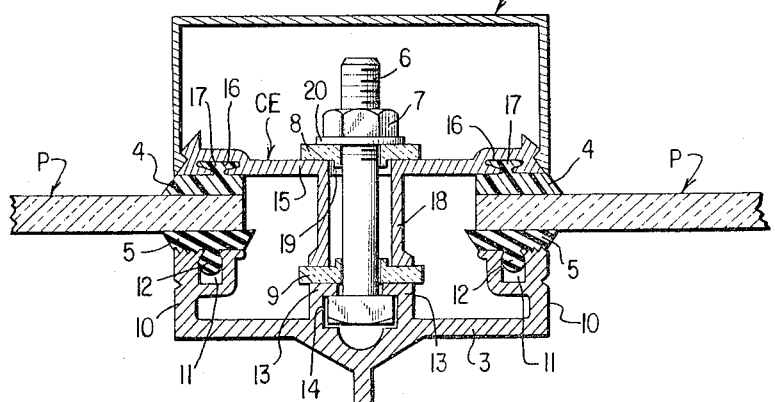

The invention may be embodied in various kinds of enclosing structures forming parts of buildings, and is particularly advantageously included in vertical side wall structures of curtain wall structures. FIGURE 1 shows such a structure generally designated CW as comprising supporting elements, more particularly vertical elongated mullions M, outside the building with reference to the wall CW, and horizontal members H and H'. The mullions M and horizontal members H, H' are connected together to provide a grid-like framework having openings which are closed by panel means P, usually but not necessarily of glass or other suitable transparent or translucent material. The mullions M and horizontal members H and H' may be connected together in any suitable way, various connecting structures being well known in the prior art. The present invention relates more particularly to the mounting of the panels P in the grid-like curtain wall structure in a manner to assure effective sealing of the panels in their mountings without, however, exerting excessive pressure on the panels, and at the same time so as substantially to eliminate or reduce to a minimum transfer of heat between highly heat conductive metallic elements respectively on the inside and outside of the curtain wall structure. Otherwise stated, the connections between metallic elements inside and outside the curtain wall CW are thermally isolated from one another.

Figure 2:
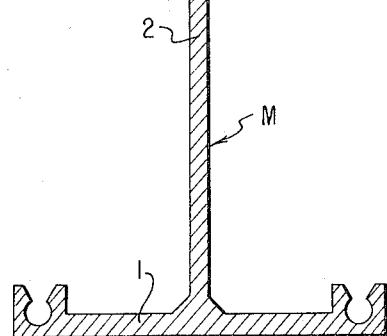
FIGURE 2 is a fragmentary horizontal section on the line 2—2 of FIGURE 1, on an enlarged scale.
Figure 3:
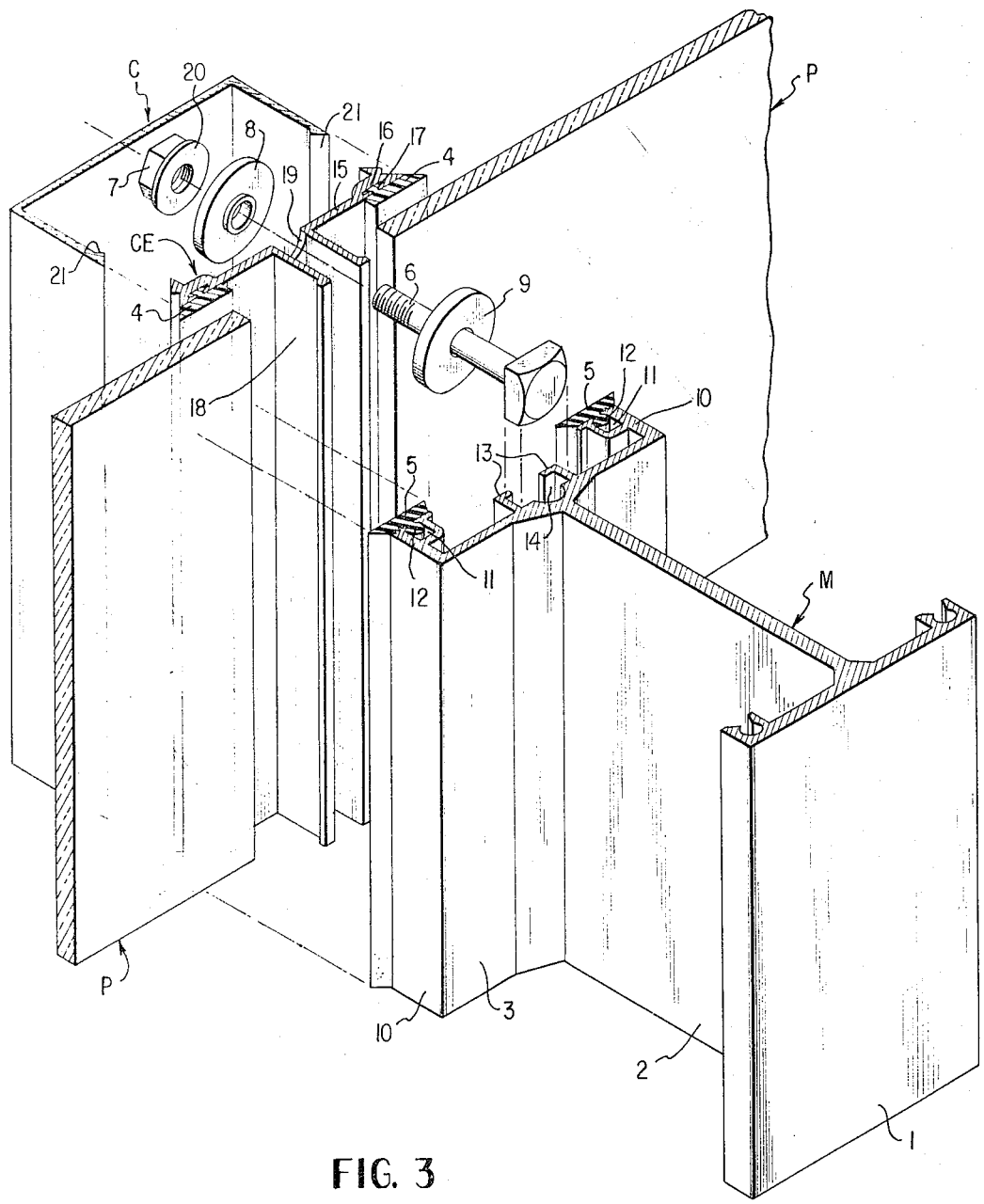
FIGURE 3 is an exploded fragmentary perspective view, partly in section, showing components of the construction illustrated in FIGURE 2 relatively separated and also on an enlarged scale.

Still considering the illustrated construction rather generally, and referring to FIGURES 2 and 3, each mullion M is of modified I-beam section having an outer flange 1, a web 2 and an inner flange 3, and is relatively highly heat conductive. A glazing member or elongated clamping element CE, also relatively highly heat conductive, is disposed inside the curtain wall CW and cooperates with the inner flange 3 of the mullion M and with sealing gasket means 4 and 5 of relatively low heat conductivity to mount the panels P under controlled pressure applied by clamping means, as shown metallic bolt and nut components 6, 7, which are relatively highly heat conductive but are thermally isolated from the clamping element CE by non-metallic insulating washers 8, 9 of relatively low heat conductivity. A cap C, which serves as a finishing member, is snap fitted onto the clamping element CE inside the curtain wall to cover the element CE, the threaded ends of the bolts 6, the nuts 7, and the heat insulating washers 8 which are interposed between the nuts 7 and the clamping element CE. A plurality of such bolt and nut equipments 6, 7 are provided at spaced intervals longitudinally of the mullion element M and clamping element CE, for example on 16″ centers in a representative construction. The bolt heads are secured to the inner flange 3 of the mullion M in spaced relation prior to erection of the mullion.

Generally stated, the arrangement is such that the transfer of heat between the highly heat conductive mullion M and the highly heat conducting clamping element CE is reduced to a minimum. This minimizes the sweating of metal parts inside the building and loss of heat from within the building during cold weather. It also minimizes the air conditioning load required to be carried during hot weather.

The invention as described rather broadly so far may be embodied in various forms as to details of construction. The illustrated construction is one of those presently preferred and in addition to having the advantages outlined above, has further advantages due to the particular construction or form of the component parts and their relative arrangement. As shown in FIGURES 2 and 3, the mullion M comprises an extruded section, for example of aluminum, the inner flange 3 of which is formed with marginal flanges 10 having grooves 11 which receive ribs 12 on the sealing gaskets 5, thus aligning the gaskets properly with the mullion and maintaining the gaskets in place while the curtain wall is being erected. Adjacent to its central plane, the mullion flange 3 is formed with two longitudinally extending spaced ribs 13 which define an undercut slot 14 which opens toward the clamping element CE in the assembled construction. The bolts 6 have their heads mounted in the undercut slot 14 and are secured to the mullion M in predetermined spaced relation in any suitable manner, as by being staked in the slot 14. Preferably, the bolts are staked in place in properly spaced relationship prior to erecting the curtain wall. Staking may be effected by peening edge portions of the ribs 13 down on both sides of the bolt heads. This may be done in a fabricating shop instead of on the erection site, which insures proper spacing of the bolts.

The glazing member or clamping element CE may also be extruded, as of aluminum, and comprises a flat plate portion 15. Adjacent to and just inside of the marginal edges of the plate portion 15 are undercut grooves 16 which receive ribs 17 on the gaskets 4 for aligning the gaskets with the clamping element CE and maintaining the gaskets in place during erection of the curtain wall.

The clamping element CE is formed with a channel-shaped extension 18 which projects from the central region of the plate portion 15 towards the slot forming ribs 13 of the mullion M and terminates adjacent to but short of the ribs 13. The extension 18 extends longitudinally throughout or substantially throughout the length of the clamping element CE. The plate portion 15 of the clamping element CE is provided with holes 19 at intervals spaced correspondingly to the spacing of the bolts 6, the holes 19 enabling the bolt shanks to be passed through the clamping element CE.

In erecting the curtain wall CW, the heat insulating washers 9 are placed over the shanks of the bolts 6, and the latter are extended relatively through the channel-shaped extension 18 and the holes 19. The heat insulating washers 8 are then placed over the threaded ends of the bolt shanks and the nuts 7 are applied. A washer 20 may be interposed between each nut 7 and heat insulating washer 8 so as to avoid scoring the latter when the nuts 7 are drawn up tight.

The nuts 7 are tightened so as to apply force to the supporting element or mullion M and the clamping element CE tending to draw the two elements together and thus to apply pressure through the sealing gaskets 4 and 5, which have cushioning properties, onto the panels P to produce the required sealing of the latter against passage of air and moisture. As is apparent from FIGURE 2, the bolts 6 are in metal-to-metal contact with the mullion M but are thermally isolated from the metallic clamping element CE by the heat insulating washers 8 and 9. The arrangement is such that the clamping element CE is free from contact with the clamping pressure applying means 6, 7 and the supporting element M. Moreover, tightening of the nuts 7 forces the channel extension 18 edge against the heat insulating washers 9 and the latter against the ribs 13 of the mullion M so as to control the pressure applied to the sealing gaskets 4 and 5. The heat insulating washer means 8 and 9 are less yieldable than the sealing gaskets 4 and 5, so that the bottoming of the channel extension 18 on the washers 9 and the latter on the ribs 13 prevents the application of excessive pressure on the gaskets 4 and 5. It is thus seen that the physical properties of the sealing gaskets 4 and 5 and the heat isolating washers 8 and 9 are important in achieving the maximum advantages of the invention. In a preferred construction, the sealing gaskets 4 inside the curtain wall CW are of black vinyl plastic, and the sealing gaskets 5 outside the curtain wall are of closed cell neoprene rubber. The heat isolating washers 8 and 9 are of a crystalline form of polymerized formaldehyde material, for example, material available from E. I. du Pont de Nemours and Co. under the name Delrin. This material is characterized by low heat conductivity, good strength and creep resistance under a wide range of temperature and humidity conditions, high fatigue endurance, corrosion resistance and resilience. Importantly, in connection with the present invention, the Delrin material is substantially less yieldable than the plastic and rubber materials forming the sealing gaskets 4 and 5.

The cap or finishing member C is of generally channel-shape. Its sides have inwardly directed ribs 21 which snap-fit into grooves in the edges of the clamping element CE. The finishing member C thus covers the clamping element CE, the bolts and nuts 6, 7, and the insulating washers 8 so as to provide a neat trim on the inside of the curtain wall CW.

Figure 4:
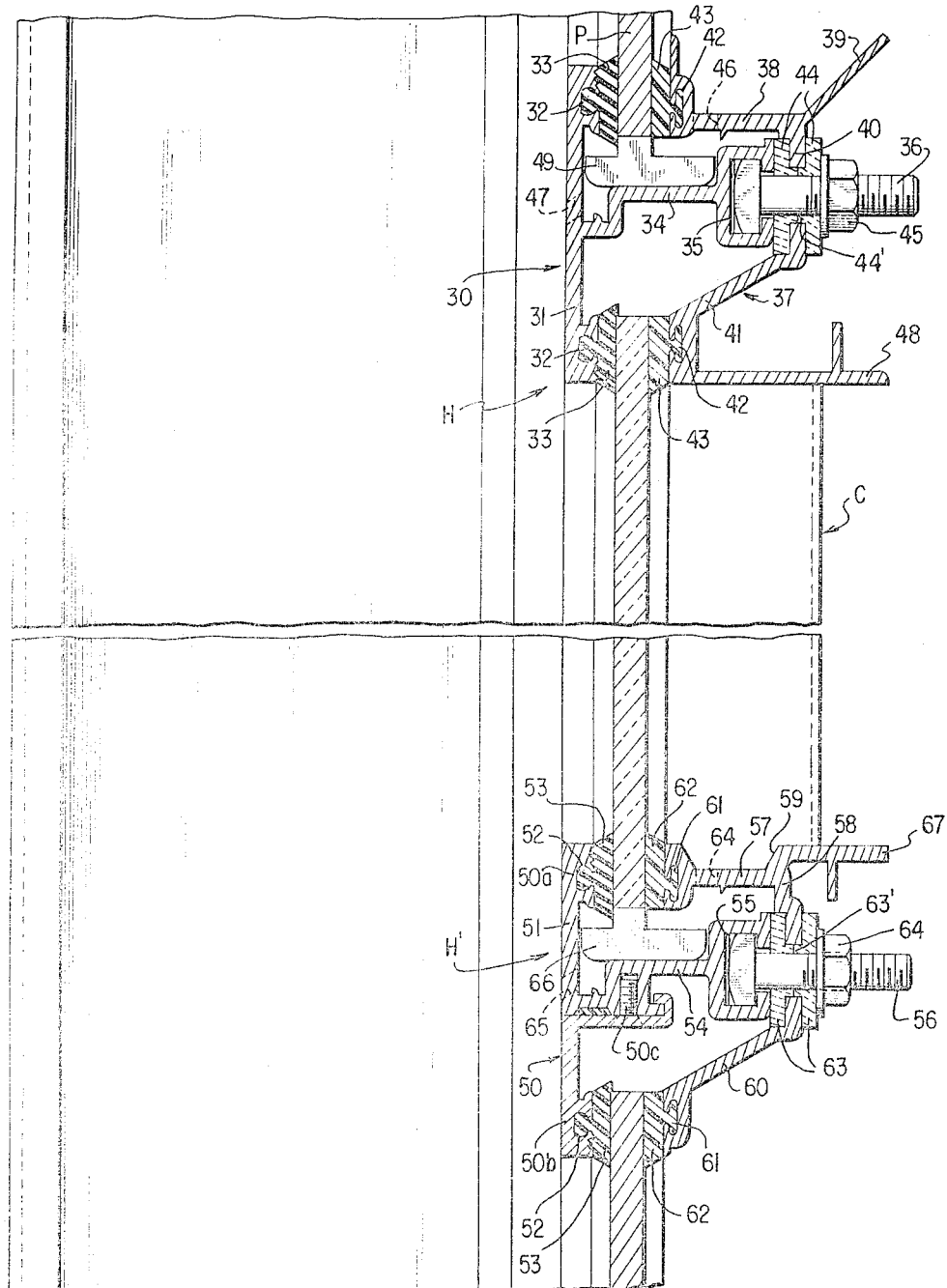
FIGURE 4 is a vertical section on the line 4—4 of FIGURE 1, broken in the middle to shorten the view, and on an enlarged scale.

FIGURE 4 shows two details of construction of horizontal supporting components of the grid-like curtain wall having the heat isolating and clamping pressure controlling advantages described above with reference to the vertical supporting components. As shown at the top in FIGURE 4, an outer metallic supporting element generally designated 30, which may comprise an extruded section, includes a flat plate-like part 31 formed along its upper and lower edge portions with grooves 32 which receive mounting ribs formed as parts of sealing gaskets 33 of closed cell neoprene rubber. The member 30 is formed with an extension 34 having a groove or slot 35 in which are mounted the heads of a plurality of metallic bolts 36 secured in predetermined spaced relationship, as by peening the groove forming ribs inwardly on both sides of the bolt heads, thus staking the bolts in place.

The composite structure H also includes an inner metallic clamping element generally designated 37 which also may comprise an extruded section. The member 37 includes an upper horizontal wall 38 having an inclined lip extension 39, a vertical wall part 40 and a lower inclined wall part 41. The vertical wall part 40 is formed with appropriately spaced holes to receive bolts 36. Grooves 42 formed in the marginal portions of the walls 38 and 41 receive the mounting ribs of black vinyl sealing gaskets 43. Delrin washers 44 having flanges 44' are mounted on each bolt 36 on opposite sides of the vertical wall part 40, the flanges 44' extending in the clearance between bolts and walls of the holes in the wall part 40. Each bolt is fitted with a nut 45 which is tightened to clamp the outer and inner members 30 and 37 toward one another to place the sealing gaskets 33 and 43 under pressure controlled by the resistance to clamping offered by the Delrin washers 44 which serve also to isolate the outer and inner members 30 and 37 thermally.

The wall 38 and lip part 39 of the inner member 37 provide a gutter for receiving condensed moisture which may drain from the inside of the curtain wall and which may be discharged from the gutter through a set of weep holes 46 deployed along the wall part 38. The moisture discharged through the weep holes 46 is in turn discharged to the outside of the curtain wall through weep holes, one of which is shown at 47 in the plate-like part 31 of the outer member 30.

The inner member 37 is formed with a projection 48 which may be used for supporting an interior part, not shown, of the building structure. Blocks, one of which is shown at 49, may be rested upon the extension 34 of the outer member 30 for supporting panels P when the latter are being set in place.

The horizontal supporting member H' construction shown in the lower part of FIGURE 4 is generally similar to that described above as to the heat isolating coupling of the inner and outer horizontal components, but there are differences of a detailed nature in the specific formation of certain of the parts. As shown at the lower part of FIGURE 4, an outer horizontal supporting element generally designated 50 comprises two parts 50a and 50b held in assembled relation by screws 50c. The assembly constituting the outer member 50 includes a flat plate-like part 51 formed with grooves 52 which receive mounting ribs on closed cell neoprene rubber sealing gaskets 53. The part 50a is formed with an extension 54 terminating in a groove or slot 55 in which are mounted the heads of a plurality of bolts 56 staked in place at predetermined intervals along the slot or groove.

The inner supporting element component of the horizontal member H' includes a horizontal wall part 57, a vertical wall part 58, an upper inclined wall part 59, and a lower inclined wall part 60. The wall parts 57 and 60 are formed with grooves 61 which receive mounting ribs of black vinyl sealing gaskets 62.

Delrin washers 63 having flanges 63' position the bolts 56 in holes in the wall part 58. Nuts 64 on the bolts 56 provide for clamping the outer and inner members of the horizontal assembly H' toward one another, the Delrin washers 63 serving both to control the pressure exerted on the sealing gaskets 53 and 62 and to isolate the outer metallic components thermally from the inner metallic components.

The depressed relation of the upper horizontal wall part 57 to the inclined wall part 59 provides a gutter for receiving condensate which may drain from the inside of the curtain wall structure, the condensate being discharged through weep holes 64 in the wall part 57 and through weep holes 65 in the outer horizontal assembly 50. Setting blocks 66 resting upon the extension 54 support the superimposed panels P when these are set in place. An extension 67 on the inner component may serve for supporting interior building elements, not shown.

The disclosed constructions embody the invention in preferred forms, but it is intended that the disclosure be illustrative rather than definitive, the invention being defined in the claims.

I claim:

1. In a building, an enclosing structure comprising a supporting element of relatively high heat conductivity; a clamping element also of relatively high heat conductivity, a first of said elements being outside the building with respect to said enclosing structure and a second of said elements being inside the building with respect to said enclosing structure; panel means interposed between and spaced from both of said elements; sealing means of relatively low heat conductivity interposed betwen and contacting said panel means and both of said elements; bolt and nut clamping pressure applying means comprising a rigid bolt component and a rigid nut component, both of relatively high heat conductivity, one of said components being connected to one of said elements; and heat insulating means of relatively low heat conductivity interposed between and engaging both the other of said components and the other of said elements, whereby tightening of said nut component on said bolt component exerts force through said heat insulating means upon said elements in a direction tending to draw said elements toward one another whereby to clamp said panel means between said elements and said sealing means, said other of said elements being free from contact with said one of said elements and from both components of said bolt and nut pressure applying means.

2. In a building, an enclosing structure according to claim 1 in which said elements are metallic, said panel means are transparent, said sealing means have cushioning properties, said clamping pressure applying means is metallic, and said heat insulating means is non-metallic.

3. In a building, an enclosing structure according to claim 1 in which said elements are elongated, said sealing means are correspondingly elongated and serve as gaskets between opposite sides of said panel means and said elements respectively, and in which said bolt component passes through said other of said elements and out of contact therewith, said heat insulating means comprising washer means interposed between said other of said elements and the nut component screwed onto said bolt component.

4. In a building, an enclosing structure according to claim 3 in which said one of said elements has an elongated under-cut slot opening toward said other of said elements; and in which said bolt and nut clamping pressure applying means comprises a plurality of bolts having their heads secured in said slot at longitudinally spaced intervals and their shanks extending through said other of said elements, and a plurality of nuts on the respective bolt shanks and bearing against said washer means.

5. In a building, an enclosing structure according to claim 1 in which said enclosing structure is a wall and one of said elements is a vertical mullion.

6. In a building, an enclosing structure according to claim 1 in which said enclosing structure is a wall and one of said elements is a horizontal member.

7. In a building, an enclosing structure according to claim 1 in which said sealing means are sufficiently yieldable to have cushioning properties and to serve as gaskets, and said heat insulating means is less yieldable than said sealing means.

8. In a building, an enclosing structure comprising a supporting element of relatively high heat conductivity; a clamping element also of relatively high heat conductivity, a first of said elements being outside the building with respect to said enclosing structure and a second of said elements being inside the building with respect to said enclosing structure; panel means interposed between and spaced from both of said elements; sealing means of relatively low heat conductivity interposed between and contacting said panel means and both of said elements; clamping pressure applying means of relatively high heat conductivity for drawing said elements toward one another; and heat insulating means interposed between said clamping pressure applying means and one of said elements, said clamping pressure applying means exerting its element-drawing-together clamping pressure through said heat insulating means, and other heat insulating means limiting the relative toward-one-another movement of said elements and controlling the pressure exerted on said sealing means and said panel means, said elements being free from contact with one another and said clamping pressure applying means being free from contact with one of said elements.

9. In a building an enclosing structure according to claim 8 in which said elements are metallic, said sealing means are resilient and have cushioning properties, said clamping pressure applying means is metallic, and said heat insulating means are less yieldable under pressure than said sealing means.

10. In a building, an enclosing structure according to claim 8 in which said elements are elongated and parallel to one another, said clamping pressure applying means comprises a plurality of spaced bolts and nuts, and said heat insulating means comprises washers on the bolt shanks.

11. In a building, an enclosing structure according to claim 10 in which one of said elements has an elongated under-cut slot opening toward the other of said elements, the bolt heads being secured in said slot in predetermined spaced relation longitudinally of said one of said elements.

12. In a building, an enclosing structure according to claim 10 including an elongated finishing member connected to said second of said elements and covering the latter, the ends of said bolt shanks, said nuts and said heat insulating means; said finishing member being free from contact with said first of said elements, said bolts and nuts, and said panel means.

References Cited

UNITED STATES PATENTS

| 2,800,983 | 7/1957 | Toney | 52—464 |
| 3,071,215 | 1/1963 | Gall | 52—395 |

FOREIGN PATENTS

| 326,085 | 1/1958 | Switzerland. |
| 1,300,846 | 7/1962 | France. |

KENNETH DOWNEY, *Primary Examiner.*